(12) United States Patent
Yamauchi et al.

(10) Patent No.: US 12,725,348 B2
(45) Date of Patent: Sep. 1, 2026

(54) CONTROL APPARATUS, CONTROL METHOD, AND STORAGE MEDIUM

(71) Applicant: CANON KABUSHIKI KAISHA, Tokyo (JP)

(72) Inventors: Shohei Yamauchi, Kanagawa (JP); Shohei Iwamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/044,722

(22) Filed: Feb. 4, 2025

(65) Prior Publication Data

US 2025/0265769 A1 Aug. 21, 2025

(30) Foreign Application Priority Data

Feb. 15, 2024 (JP) ................................ 2024-021469

(51) Int. Cl.
*G06T 7/70* (2017.01)
*G06T 15/20* (2011.01)

(52) U.S. Cl.
CPC ................ *G06T 15/20* (2013.01); *G06T 7/70* (2017.01); *G06T 2200/24* (2013.01)

(58) Field of Classification Search
CPC ....... G06T 15/20; G06T 7/70; G06T 2200/24; G06T 15/205
See application file for complete search history.

(56) References Cited

U.S. PATENT DOCUMENTS

| | | | | |
|---|---|---|---|---|
| 11,954,865 | B2 | 4/2024 | Yamauchi | |
| 12,159,432 | B2 | 12/2024 | Yamauchi | |
| 2018/0246631 | A1* | 8/2018 | Maruyama | G06T 19/20 |
| 2018/0341386 | A1* | 11/2018 | Inomata | A63F 13/211 |
| 2021/0014425 | A1* | 1/2021 | Matsubayashi | H04N 5/2224 |
| 2022/0027115 | A1* | 1/2022 | Haapoja | G09G 5/14 |
| 2024/0144592 | A1 | 5/2024 | Iwamoto | |
| 2024/0169552 | A1 | 5/2024 | Yamauchi | |
| 2025/0021217 | A1 | 1/2025 | Iwamoto | |

FOREIGN PATENT DOCUMENTS

| | | |
|---|---|---|
| JP | 2015-187797 A | 10/2015 |

* cited by examiner

*Primary Examiner* — Towfiq Elahi
(74) *Attorney, Agent, or Firm* — Carter, DeLuca & Farrell LLP

(57) ABSTRACT

There is obtained an operation signal designating a position and an orientation in a virtual space of a virtual viewpoint corresponding to a virtual viewpoint image to be generated based on a plurality of captured images obtained by performing image capturing with a plurality of image capturing devices. A second virtual viewpoint facing a first virtual viewpoint identified by the obtained operation signal is then determined. In response to an instruction from an operator based on a virtual viewpoint image corresponding to the determined second virtual viewpoint, virtual viewpoint information representing the first virtual viewpoint or the second virtual viewpoint is set. This realizes a virtual viewpoint image reproducing the viewpoint of a person or the like with high accuracy.

7 Claims, 9 Drawing Sheets

CONTROL APPARATUS, CONTROL METHOD, AND STORAGE MEDIUM

BACKGROUND

Field

The present disclosure relates to a technique to control a virtual viewpoint used for generating a virtual viewpoint image.

Description of the Related Art

There is a technique to generate an image (virtual viewpoint image) representing an appearance from a virtual image capturing device (virtual viewpoint) that does not exist in a three-dimensional space to be captured by installing a plurality of image capturing devices in different positions to perform synchronous image capturing and by using a plurality of captured images obtained by the image capturing. In the case of generating a virtual viewpoint image, an operator generally sets the position and orientation of a new virtual viewpoint by operating a joystick or the like while referring to an already generated virtual viewpoint image corresponding to the virtual viewpoint capturing an object on a UI screen. The virtual viewpoint can be moved throughout the entire three-dimensional space to be captured as a target, and the movement path of the virtual viewpoint set continuously in a time series is generally called "camera path" or the like.

For example, in the case of generating a virtual viewpoint image of a sports game such as a basketball game, there is a demand to reproduce a video from a virtual viewpoint corresponding to a player's line of sight. In this case, the operator operates the joystick or the like to designate the position and orientation of the virtual viewpoint so that the position and orientation of the virtual viewpoint correspond to the position and orientation of the face of a target player on the UI screen, respectively. However, since the virtual viewpoint after being moved by such an operation overlaps with the target player on the UI screen, the target player is not seen in an image corresponding to the virtual viewpoint.

Thus, the operator who operates the joystick or the like while looking at the image corresponding to the designated virtual viewpoint cannot check whether the orientation (line of sight) of the virtual viewpoint designated by the operator corresponds to the actual line of sight of the target player. In this regard, Japanese Patent Laid-Open No. 2015-187797 discloses a method for designating, for example, a specific player and then designating, for example, a ball as a gaze point, thereby generating a free-viewpoint video in the case of the ball being viewed from the player. In this method, it is only required that the player actually look only at the gaze point specified by the operator (here, the ball), but in a case where the player actually looks at something other than the ball (another player, the goal, etc.), the player's line of sight in the strict sense cannot be reproduced.

SUMMARY

The present disclosure is made in consideration of the above problems and aims to realize a virtual viewpoint image reproducing the viewpoint of a person or the like with high accuracy.

A virtual viewpoint control apparatus according to the present disclosure includes: an acquisition unit configured to obtain an operation signal designating a position and an orientation in a virtual space of a virtual viewpoint corresponding to a virtual viewpoint image to be generated based on a plurality of captured images obtained by performing image capturing with a plurality of image capturing devices; a determination unit configured to determine a second virtual viewpoint facing a first virtual viewpoint identified by the obtained operation signal; and a setting unit configured to set virtual viewpoint information representing the first virtual viewpoint or the second virtual viewpoint in response to an instruction from an operator based on a virtual viewpoint image corresponding to the determined second virtual viewpoint.

Further features of the present disclosure will become apparent from the following description of exemplary embodiments with reference to the attached drawings.

DESCRIPTION OF THE EMBODIMENTS

Figure 1:
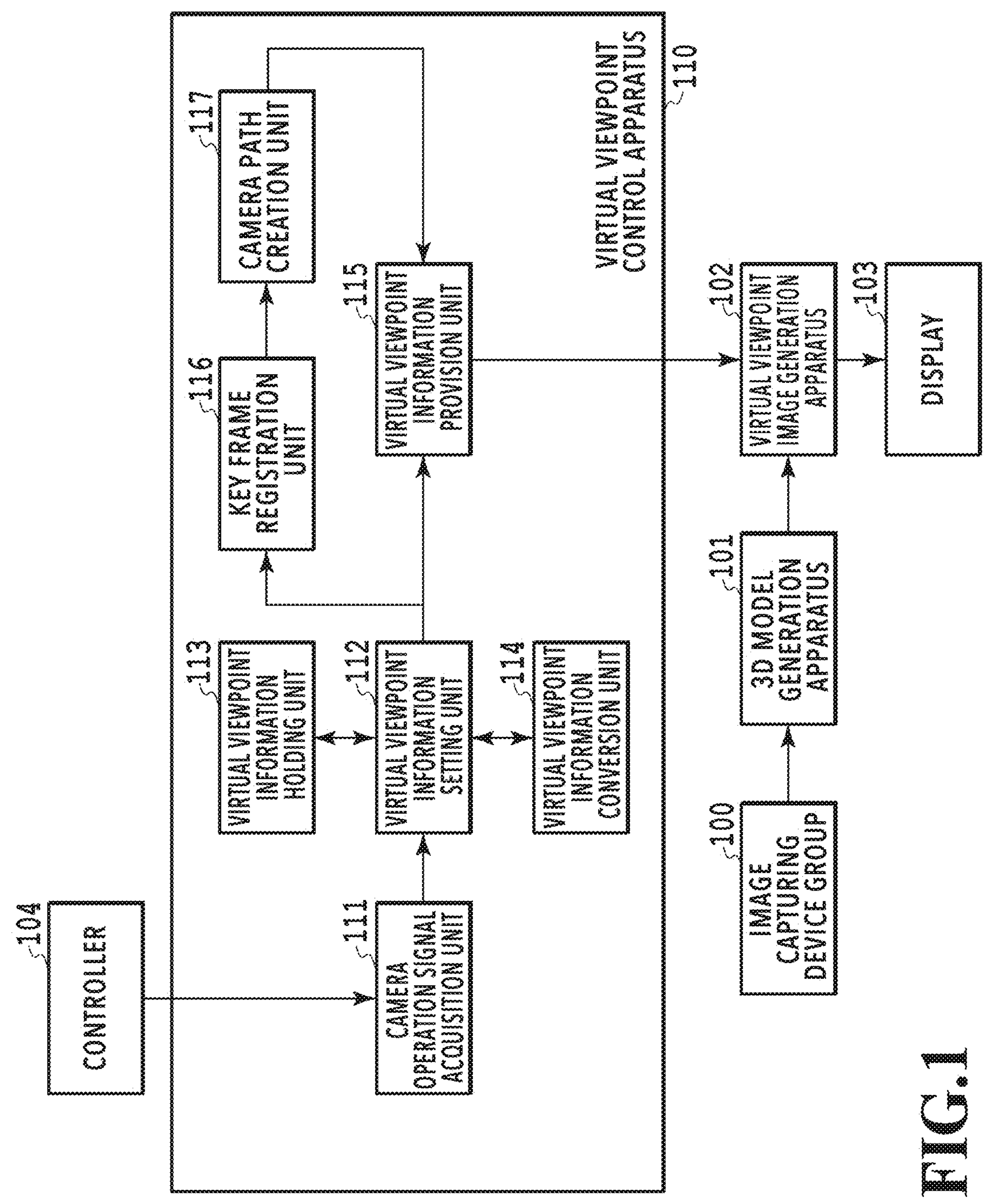
FIG. 1 is a diagram showing a configuration example of an image processing system that generates a virtual viewpoint image according to a first embodiment.

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

Before describing each embodiment, a brief overview of a virtual viewpoint image will be described. The virtual viewpoint image is an image representing an appearance from the viewpoint of a virtual image capturing device different from the viewpoint of an actual image capturing device, and is also called free-viewpoint image. A virtual viewpoint is set by a method, such as a method in which an operator directly designates the virtual viewpoint by operating a controller or a method in which the operator selects the virtual viewpoint from, for example, a plurality of virtual viewpoint candidates set in advance. Virtual viewpoint images include both moving images and still images.

In the following embodiments, a moving image is used as an example for explanation, but the present disclosure is also applicable to still images. Information that indicates the transition of a virtual viewpoint and is necessary in the case of the moving image is called "camera path." The camera path defines the movement of a virtual image capturing device (hereinafter referred to as "virtual camera") in a moving image created by sequentially reproducing a plurality of virtual viewpoint images or CG images arranged in a time series. The camera path is managed by using frames and timelines. A frame holds information necessary for generating each image that forms the moving image. Specifically, the frame holds information such as a scene time (time code) and the position and orientation of the camera. The scene time is represented by, for example, a time code showing the time at which a game to be captured is started as a 00:00:00.00 frame. A timeline shows a frame time on a single time axis. The number of frames included in the timeline is determined depending on the number of images reproduced per second (frame rate). For example, in a case where the frame rate is 60 frames/second, 60 frames per second are included in the timeline. Specifically, a reference frame is called "key frame," and the time of a start key frame and the time of an end key frame are indicated on the timeline. A video content producer creates a camera path by repeatedly determining the position and orientation of a virtual camera at any time code and registering at least two or more key frames. In editing a camera path using key frames, frames are divided into two types: key frames and intermediate frames. For the key frames, a user who edits the camera path explicitly designates information. On the other hand, for the intermediate frames, which are frames between the key frames, the system determines virtual viewpoint information by interpolating a gap between the key frames.

<System Configuration>

FIG. 1 is a diagram showing the configuration example of an image processing system that generates a virtual viewpoint image according to the present embodiment. The image processing system includes an image capturing device group 100, a 3D model generation apparatus 101, a virtual viewpoint image generation apparatus 102, a display 103, a controller 104, and a virtual viewpoint control apparatus 110. For convenience, a virtual viewpoint image in the form of a moving image will be hereinafter referred to as "virtual viewpoint video."

The image capturing device group 100 performs image capturing from a plurality of directions with all the devices synchronized in time in order to generate shape data (generally called "3D model") that represents the three-dimensional shape of an object (subject). A plurality of pieces of moving image data obtained by the image capturing are sent to the 3D model generation apparatus 101, and a 3D model is generated for each frame using a method such as the visual volume intersection method. The visual volume intersection method is a method for extracting a silhouette of an object from each of a plurality of captured images, back-projecting each silhouette into an original three-dimensional space, and obtaining an intersection portion of each visual volume, thereby obtaining the three-dimensional shape of the object. The generated 3D model is stored in a storage device (not shown) in an apparatus, and the 3D model is output in response to an acquisition request from the virtual viewpoint image generation apparatus 102. The virtual viewpoint control apparatus 110 receives a camera operation signal from the controller 104 and generates virtual viewpoint information indicating the position, orientation, and the like of a virtual camera. The generated virtual viewpoint information is then provided to the virtual viewpoint image generation apparatus 102. The virtual viewpoint image generation apparatus 102 performs rendering processing based on the 3D model of the object and the virtual viewpoint information and generates a virtual viewpoint image that represents the appearance of the object from a virtual viewpoint indicated by the virtual viewpoint information. The generated virtual viewpoint image is displayed on the display 103.

The virtual viewpoint control apparatus 110 includes a camera operation signal acquisition unit 111, a virtual viewpoint information setting unit 112, a virtual viewpoint information holding unit 113, a virtual viewpoint information conversion unit 114, and a virtual viewpoint information provision unit 115. Each unit of the virtual viewpoint control apparatus 110 will be described below.

Figure 2A:
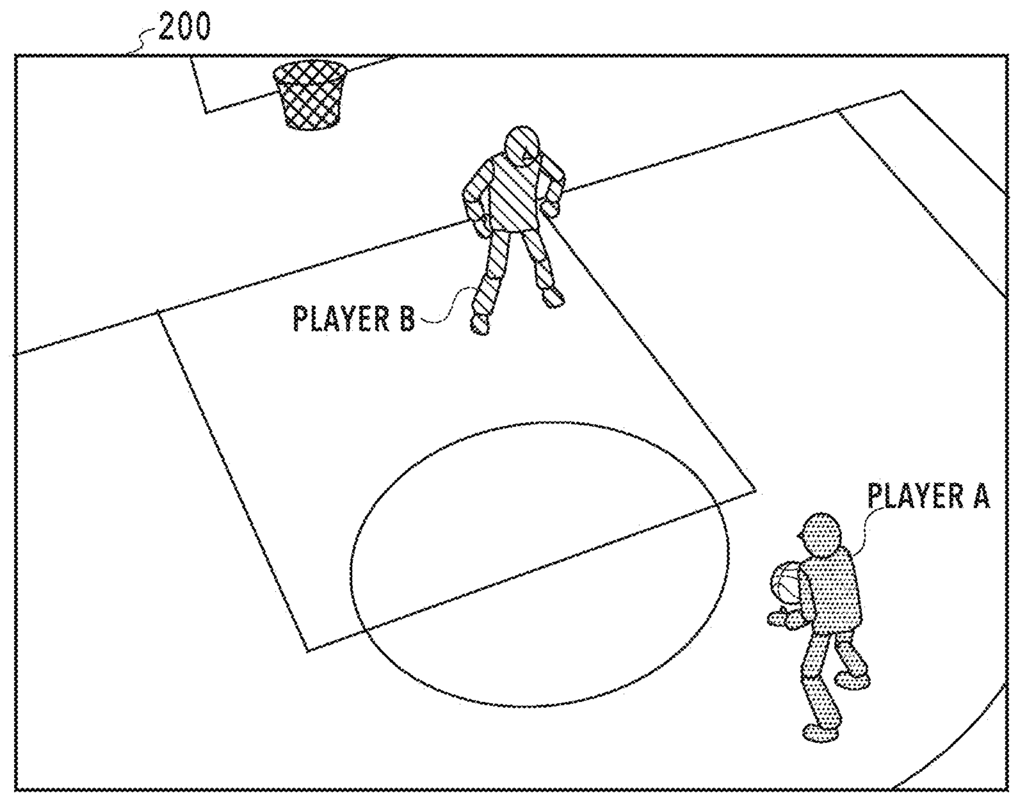
FIG. 2A is a diagram for explaining a UI screen used to designate the position and orientation of a virtual camera.

The camera operation signal acquisition unit 111 obtains from the controller 104 a camera operation signal generated in response to an operator operating the virtual camera using a joystick or the like. The virtual viewpoint information according to the present embodiment includes parameters such as a zoom (focal length) and a time in addition to the position and orientation of the virtual camera. In this case, the position of the virtual camera is indicated by three-dimensional coordinate information in accordance with a Cartesian coordinate system of three axes, an X axis, a Y axis, and a Z axis. The origin in this case is any position (e.g., the center of a court) in a three-dimensional space to be captured. The orientation of the virtual camera (the direction of the virtual viewpoint) is indicated by angles formed with three axes, a pan, a tilt, and a roll, where the pan is an angle of rotation parallel to the ground surface, the tilt is an angle of rotation perpendicular to the ground surface, and the roll is an angle of rotation around the optical axis of the virtual camera. The time is indicated by a time code. The zoom and time are each one-axis parameters. That is, a virtual viewpoint at a certain moment is identified by [X, Y, Z] (unit [m]), [Pan, Tilt, Roll] (unit [degree]), [Zoom] (unit [mm]), and a time code [HH.MM.SS.FF]. A camera operation signal input from the controller 104 represents the amounts of change between frames in the position, orientation, and zoom of the virtual viewpoint [ΔX, ΔY, ΔZ, ΔPan, ΔTilt, ΔRoll, ΔZoom]. FIG. 2A shows an example of a user interface screen (UI screen) used in a case where an operator designates the position and orientation of a virtual camera. The UI screen 200 now displays a virtual viewpoint image in a state where a basketball court which is an image capturing space is viewed from above. The operator creates a camera path by registering a key frame while looking at such a virtual viewpoint image corresponding to a camera operation signal at this point in time. A description will be given below of, for example, a case where a virtual viewpoint video from the line of sight of a player A is created. Incidentally, parameters other than the above eight axes may be included, or not all of the above eight axes parameters have to be included.

Figure 2B:
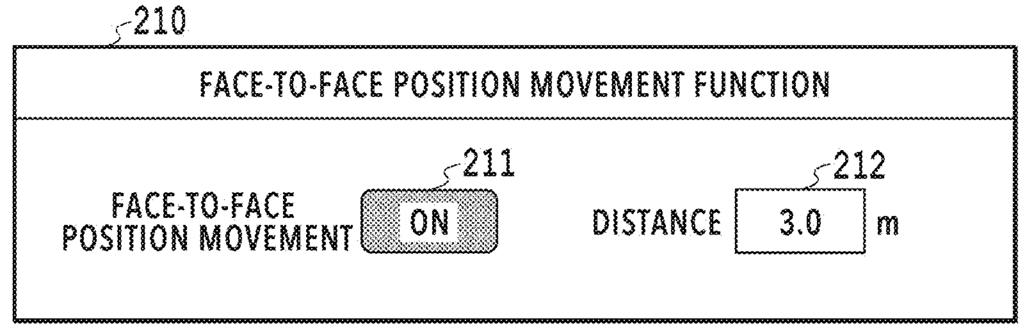
FIG. 2B is a diagram for explaining a UI screen for designating an operation mode.

The virtual viewpoint information setting unit 112 calculates virtual viewpoint information in the current frame based on the virtual viewpoint information held by the virtual viewpoint information holding unit 113 and a camera operation signal obtained by the camera operation signal acquisition unit 111. The calculated virtual viewpoint information is sent to and held in the virtual viewpoint information holding unit 113, and is used to calculate virtual viewpoint information in the next frame. The calculated virtual viewpoint information is also sent to the virtual viewpoint information conversion unit 114 in accordance with an operation mode, and is converted into provisional virtual viewpoint information for checking whether the line of sight direction of the virtual camera indicated by the virtual viewpoint information is appropriate. Here, there are two types of operation modes: a face-to-face movement mode and a normal mode. The face-to-face movement mode is an operation mode in which virtual viewpoint information generated based on a camera operation signal is converted into virtual viewpoint information (hereinafter referred to as "face-to-face virtual viewpoint information") in a case where a virtual camera represented by the virtual viewpoint information is moved to the face-to-face position. The normal mode is a normal operation mode in which no such conversion is performed. FIG. 2B is a diagram showing an example of a UI screen on which an operator designates one of the operation modes. The UI screen in FIG. 2B includes a pull-down menu 201 for switching the face-to-face movement mode between enabled (ON) and disabled (OFF), and an input field 202 for the operator to designate a distance D to the face-to-face position in a case where the face-to-face movement mode is enabled. The operator designates the operation mode in advance via the UI screen as shown in FIG. 2B. The operation mode may be configured to be switched by, for example, pressing a predetermined button provided on a controller for operating the virtual camera. The distance to the face-to-face position may also be configured to be changeable, for example, with a seek bar. The virtual viewpoint information setting unit 112 sets the calculated virtual viewpoint information in the current frame or the face-to-face virtual viewpoint information received from the virtual viewpoint information conversion unit 114 in accordance with the operation mode, and outputs the information to the virtual viewpoint information provision unit 115.

The virtual viewpoint information holding unit 113 holds virtual viewpoint information received from the virtual viewpoint information setting unit 112. In a case where the virtual viewpoint information holding unit 113 receives new virtual viewpoint information from the virtual viewpoint information setting unit 112, the virtual viewpoint information holding unit 113 updates the held virtual viewpoint information.

The virtual viewpoint information conversion unit 114 converts the virtual viewpoint information received from the virtual viewpoint information setting unit 112 into face-to-face virtual viewpoint information representing a virtual viewpoint moved to a face-to-face position of a virtual viewpoint represented by the virtual viewpoint information. The conversion method will be described later in detail.

The virtual viewpoint information provision unit 115 provides the virtual viewpoint image generation apparatus 102 via a network such as a LAN with the virtual viewpoint information and the face-to-face virtual viewpoint information set by the virtual viewpoint information setting unit 112. The virtual viewpoint information provision unit 115 also receives a clip reproduction instruction from an operator, obtains a corresponding camera path, and provides the virtual viewpoint image generation apparatus 102 with the camera path via a network such as a LAN.

The key frame registration unit 116 registers virtual viewpoint information at a specific time as a key frame based on a key frame registration instruction from an operator. A camera path is created based on the key frame thus registered.

A camera path creation unit 117 creates a camera path based on a camera path creation instruction from an operator, using a plurality of key frames registered by the key frame registration unit 116. An ID is appended to the created camera path, and the created camera path is stored in an auxiliary storage device 314, which will be described later.

<Hardware Configuration>

Figure 3:
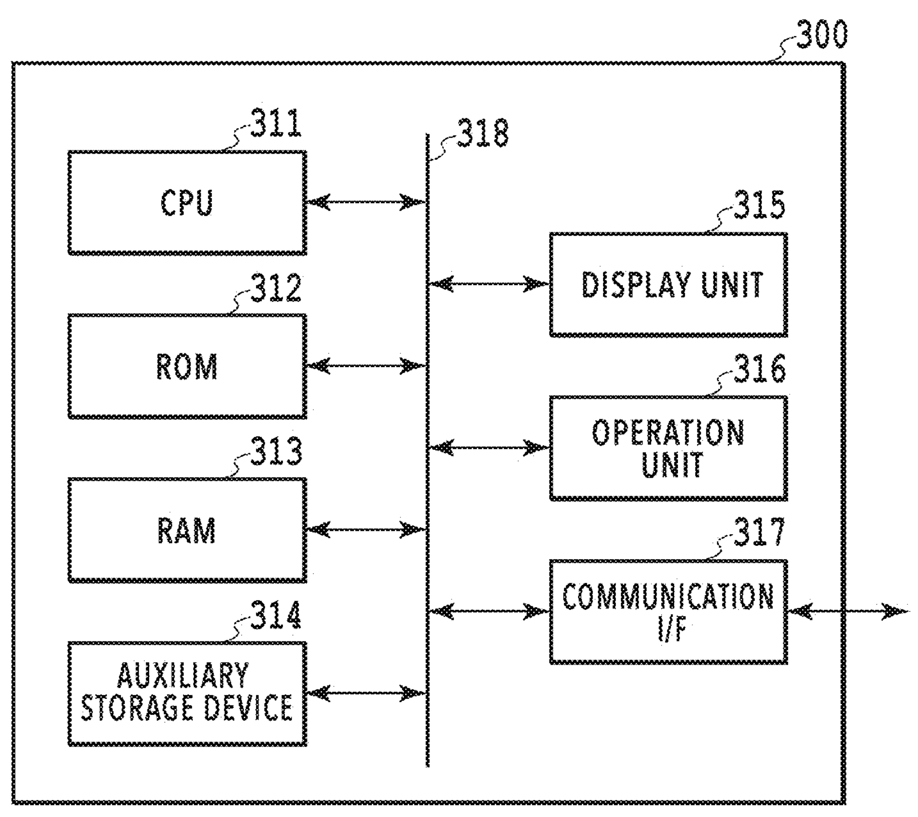
FIG. 3 is a block diagram showing a basic hardware configuration of an information processing apparatus.

FIG. 3 is a block diagram showing a basic hardware configuration common to each information processing apparatus (the 3D model generation apparatus 101, virtual viewpoint image generation apparatus 102, and virtual viewpoint control apparatus 110). A CPU 311, a ROM 312, a RAM 313, an auxiliary storage device 314, a display unit 315, an operation unit 316, a communication I/F 317, and a bus 318 are included. The CPU 311 implements each function of the apparatuses by controlling the entire apparatus using computer programs and data stored in the ROM 312 and RAM 313. It should be noted that one or more pieces of dedicated hardware different from the CPU 311 may be included, and at least a portion of processing by the CPU 311 may be executed by the dedicated hardware. Examples of the dedicated hardware include an application specific integrated circuit (ASIC), a field programmable gate array (FPGA), and a digital signal processor (DSP). The ROM 312 stores a program that does not need to be changed and the like. The RAM 313 temporarily stores programs and data supplied from the auxiliary storage device 314, data supplied from the outside via the communication I/F 317, and the like. The auxiliary storage device 314 includes, for example, a hard disk drive, and stores various kinds of data such as image data and audio data. The display unit 315 includes, for example, a liquid crystal display and an LED, and displays a graphical user interface (GUI) for an operator to operate each apparatus and the like. The operation unit 316 includes, for example, a keyboard, a mouse, and a touch panel, and inputs various instructions to the CPU 311 in response to an operation from the operator. The CPU 311 operates as a display control unit that controls the display unit 315 and an operation control unit that controls the operation unit 316. The communication I/F 317 is used for communication between an external device and a corresponding apparatus. For example, in the case of connection to an external device by wire, a communication cable is connected to the communication I/F 317. Further, in the case of having the function of wireless communication with an external device, the communication I/F 317 includes an antenna. The bus 318 connects each unit in the apparatus to transmit information. In the present embodiment, the display unit 315 and the operation unit 316 exist inside the apparatus, but at least one of the display unit 315 and the operation unit 316 may exist as a separate device outside the apparatus.

<Operation Flow of Virtual Viewpoint Control Apparatus>

Figure 4:
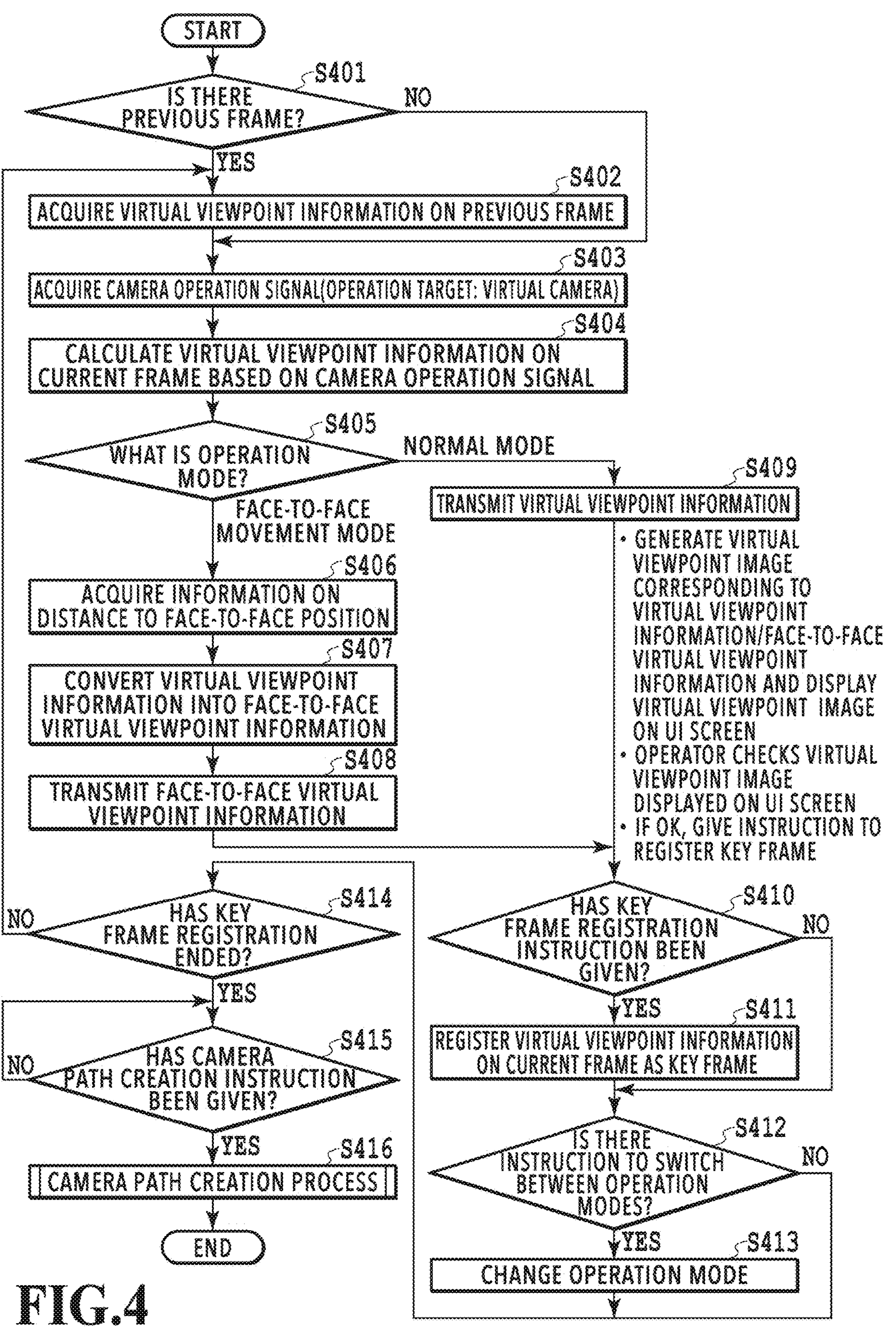
FIG. 4 is a flowchart showing a flow of operations in a virtual viewpoint control apparatus according to the first embodiment.

FIG. 4 is a flowchart showing the flow of operations in the virtual viewpoint control apparatus 110 according to the present embodiment. A description will be given below of a flow until a camera path including virtual viewpoint information on the line of sight of a player during a basketball game is completed with reference to the flowchart in FIG. 4, with reference to specific examples as appropriate. The operation mode at the start of this flow is a normal mode, and this flow is executed while a clip is not being reproduced. Further, this flow is executed on a frame-by-frame basis, but may be executed at thinned frame intervals. In the following description, the symbol "S" means a step.

In S401, a step to be executed next is determined based on whether there is a previous frame that has already been processed. In a case where there is a previous frame, S402 is executed, and in a case where there is no previous frame, S402 is skipped and S403 is executed. For example, immediately after the process has just started, there is no previous frame, so that the present step is skipped.

In S402, the virtual viewpoint information setting unit 112 obtains virtual viewpoint information on the previous frame from the virtual viewpoint information holding unit 113. The following description will be given on the assumption that $[X_{prev}, Y_{prev}, Z_{prev}, Pan_{prev}, Tilt_{prev}, Roll_{prev}, Zoom_{prev}]=[-9.0, 2.0, 1.9, -95.0, 0.0, 0.0, 20.0]$ is obtained as the virtual viewpoint information on the previous frame.

In S403, the camera operation signal acquisition unit 111 obtains a camera operation signal corresponding to the current frame of interest as a processing target from the controller 104. It is assumed that the amounts of change from the previous frame $[\Delta X, \Delta Y, \Delta Z, \Delta Pan, \Delta Tilt, \Delta Roll, \Delta Zoom]=[0.0, 0.0, 0.0, -5.0, 0.0, 0.0, 0.0]$ are obtained here. The obtained camera operation signal is output to the virtual viewpoint information setting unit 112.

In S404, the virtual viewpoint information setting unit 112 calculates virtual viewpoint information on the current frame based on the virtual viewpoint information on the previous frame obtained in S402 and the camera operation signal obtained in S403. Equations 1 to 7 below are used to calculate virtual viewpoint information.

$$X_{curr} = X_{prev} + \Delta X \quad \text{Equation 1}$$

$$Y_{curr} = Y_{prev} + \Delta Y \quad \text{Equation 2}$$

$$Z_{curr} = Z_{prev} + \Delta Z \quad \text{Equation 3}$$

$$\text{Pan}_{curr} = \text{Pan}_{prev} + \Delta\text{Pan} \quad \text{Equation 4}$$

$$\text{Tilt}_{curr} = \text{Tilt}_{prev} + \Delta\text{Tilt} \quad \text{Equation 5}$$

$$\text{Roll}_{curr} = \text{Roll}_{prev} + \Delta\text{Roll} \quad \text{Equation 6}$$

$$\text{Zoom}_{curr} = \text{Zoom}_{prev} + \Delta\text{Zoom} \quad \text{Equation 7}$$

In Equations 1 to 7 above, $[X_{curr}, Y_{curr}, Z_{curr}, Pan_{curr}, Tilt_{curr}, Roll_{curr}, Zoom_{curr}]$ represent virtual viewpoint information on the current frame. $[X_{prev}, Y_{prev}, Z_{prev}, Pan_{prev}, Tilt_{prev}, Roll_{prev}, Zoom_{prev}]$ represent virtual viewpoint information on the previous frame. Now, in a case where the virtual viewpoint information on the previous frame obtained in S401 and the camera operation signal indicating the amount of change from all frames obtained in S402 are applied to Equations 1 to 7 above, Table 1 below is obtained.

TABLE 1

| |
|---|
| $X_{curr} = -9.0 + 0.0$ |
| $Y_{curr} = 2.0 + 0.0$ |
| $Z_{curr} = 1.9 + 0.0$ |
| $Pan_{curr} = -95.0 + (-5.0)$ |
| $Tilt_{curr} = 0.0 + 0.0$ |
| $Roll_{curr} = 0.0 + 0.0$ |
| $Zoom_{curr} = 20.0 + 0.0$ |

In the above example, only the pan angle of a virtual camera arranged over the position of the player A is adjusted. As a result, the virtual viewpoint information on the current frame, $[X_{curr}, Y_{curr}, Z_{curr}, Pan_{curr}, Tilt_{curr}, Roll_{curr}, Zoom_{curr}]=[-9.0, 2.0, 1.9, -100.0, 0.0, 0.0, 20.0]$ is calculated. The calculated virtual viewpoint information on the current frame is saved in the RAM 313, then held by the virtual viewpoint information holding unit 113, and used as the virtual viewpoint information on the previous frame in the calculation of virtual viewpoint information on a next current frame.

In S405, a step to be executed next is determined based on the current operation mode. In a case where the current operation mode is the normal mode, S409 is executed next, and in a case where the current operation mode is the face-to-face movement mode, S406 is executed next.

In S406, the virtual viewpoint information conversion unit 114 obtains the value of the distance D input into the input field 202 on the UI screen shown in FIG. 2B described above. It is now assumed that the distance D=5 m is obtained.

In S407, the virtual viewpoint information conversion unit 114 converts the virtual viewpoint information calculated in S404 into face-to-face virtual viewpoint information. Here, the virtual camera in a face-to-face position represented by the face-to-face virtual viewpoint information after the conversion is restricted to rotate around a vertical axis passing through a point a predetermined distance (half the distance D, described later.) away in the direction in which the original virtual camera represented by the virtual viewpoint information before the conversion. Specifically, the face-to-face virtual viewpoint information $[X'_{curr}, Y'_{curr}, Z'_{curr}, Pan'_{curr}, Tilt'_{curr}, Roll'_{curr}, Zoom'_{curr}]$ is calculated using Equations 8 to 14 below.

$$X'_{curr} = X_{curr} + D * \sin(\text{Pan}_{curr}) * \cos(\text{Tilt}_{curr}) \quad \text{Equation 8}$$

$$Y'_{curr} = Y_{curr} + D * \cos(\text{Pan}_{curr}) * \cos(\text{Tilt}_{curr}) \quad \text{Equation 9}$$

$$Z'_{curr} = Z_{curr} + D * \sin(\text{Tilt}_{curr}) \quad \text{Equation 10}$$

$$\text{Pan}'_{curr} = \text{Pan}_{curr} + \pi \quad \text{Equation 11}$$

$$\text{Tilt}'_{curr} = -\text{Tilt}_{curr} \quad \text{Equation 12}$$

$$\text{Roll}'_{curr} = -\text{Roll}_{curr} \quad \text{Equation 13}$$

$$\text{Zoom}'_{curr} = \text{Zoom}_{curr} \quad \text{Equation 14}$$

Now, in a case where the virtual viewpoint information on the current frame $[X_{curr}, Y_{curr}, Z_{curr}, Pan_{curr}, Tilt_{curr}, Roll_{curr}, Zoom_{curr}]=[-9.0, 2.0, 1.9, -100.0, 0.0, 0.0, 20.0]$ and the distance D=5 m are applied to Equations 8 to 14 above, Table 2 below is obtained.

TABLE 2

| |
|---|
| $X'_{curr} = -9.0 + 5.0 * \sin(-10.0) * \cos(0)$ |
| $Y'_{curr} = 2.0 + 5.0 * \cos(-10.0) * \cos(0)$ |
| $Z'_{curr} = 1.9 + 5.0 * \sin(0)$ |
| $Pan'_{curr} = -10.0 + 180$ |
| $Tilt'_{curr} = -0$ |
| $Roll'_{curr} = -0$ |
| $Zoom'_{curr} = 20$ |

As described above, in general, "180" is assigned to "x" in Equation 11, but any value that can realize positions that can be said to be roughly opposite (for example, within the range of 160 to 200) may be assigned.

Figure 5A:
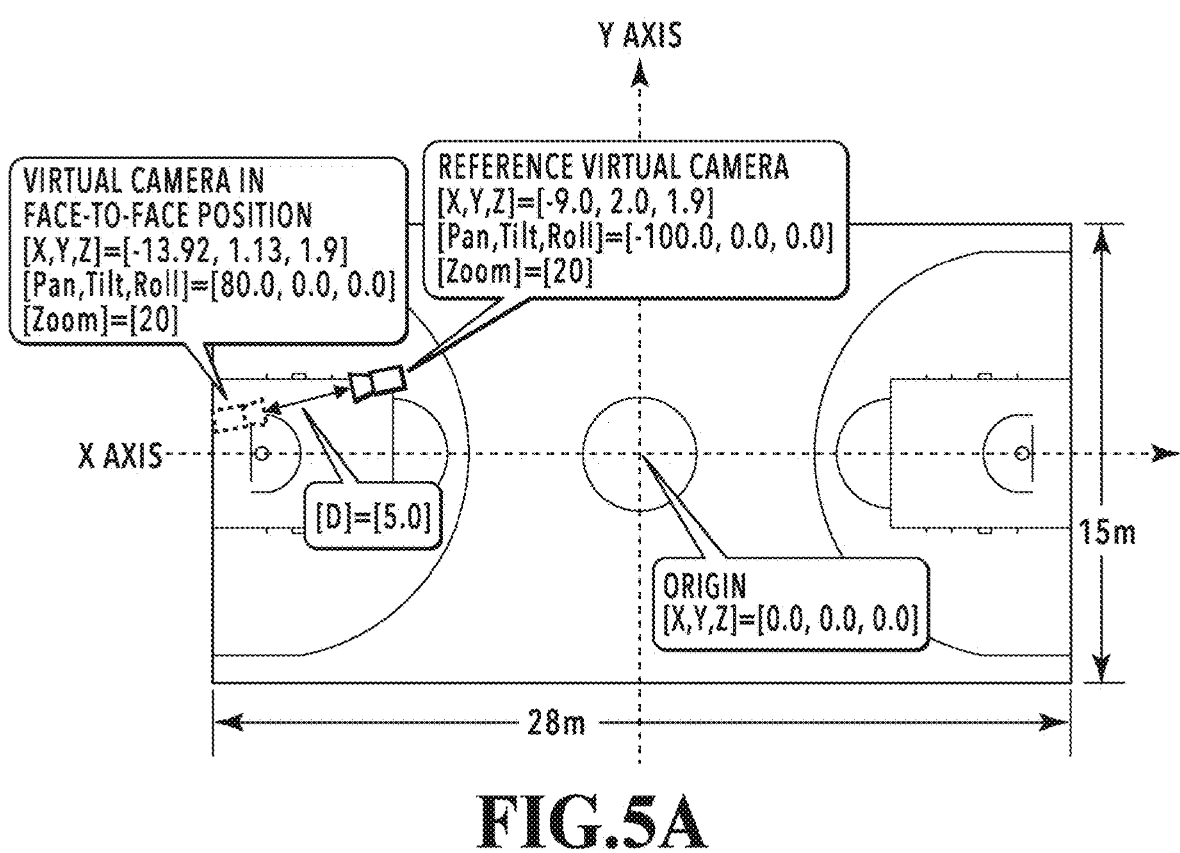
FIGS. 5A and 5B are diagrams for explaining a specific example in which virtual viewpoint information is converted into face-to-face virtual viewpoint information.
Figure 5B:
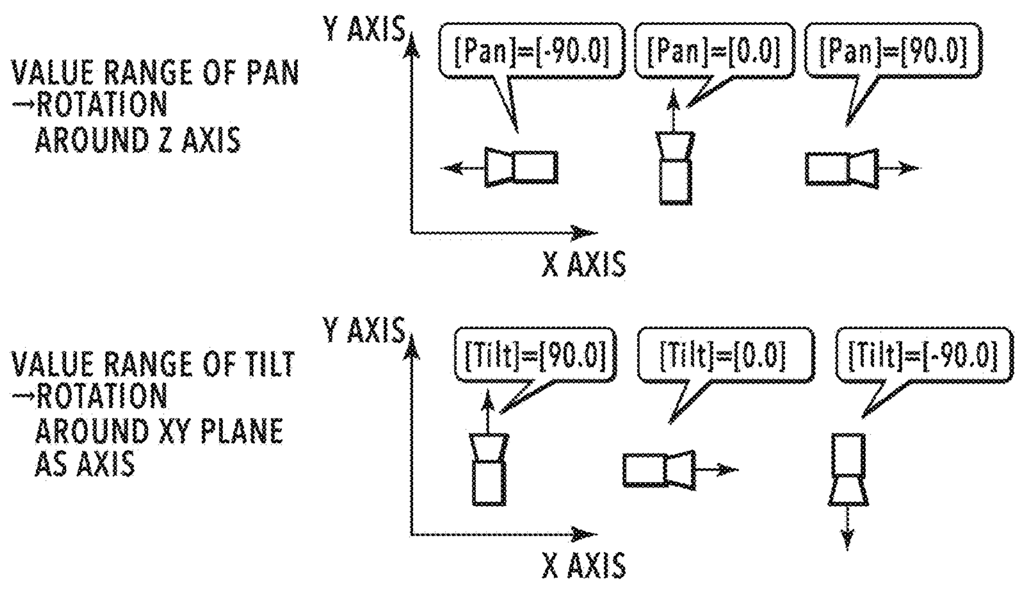

FIGS. 5A and 5B show the above specific example. It can be seen that in a virtual image capturing space having the center of a basketball court as the origin, a virtual camera in a face-to-face position is designated at the distance D away from the virtual camera designated to overlap the position of the player A. The face-to-face virtual viewpoint information in a case where the virtual camera in the current frame is thus moved to the face-to-face position, $[X'_{curr}, Y'_{curr}, Z'_{curr}, Pan'_{curr}, Tilt'_{curr}, Roll'_{curr}, Zoom'_{curr}]=[-13.92, 1.13, 1.9, 80.0, 0.0, 0.0, 20.0]$ is calculated. Incidentally, in the conversion using Equations 8 to 14 above, the virtual camera in the face-to-face position represented by the virtual viewpoint information after the conversion becomes a virtual camera in a state where the virtual camera represented by the virtual viewpoint information before the conversion is reflected in a mirror. For example, Equation 15 below may be used instead of Equation 13 so that rotation parameters are not changed.

$$Roll'_{curr} = Roll_{curr} \qquad \text{Equation 15}$$

The face-to-face virtual viewpoint information thus obtained is stored in the RAM 313.

Figures 6A, 6B:
FIG. 6A is a diagram for explaining a virtual viewpoint image corresponding to the virtual viewpoint information.
FIG. 6B is a diagram for explaining a virtual viewpoint image corresponding to the face-to-face virtual viewpoint information.

In S408, the virtual viewpoint information provision unit 115 transmits the face-to-face virtual viewpoint information on the current frame obtained in S407 or the virtual viewpoint information on the current frame calculated in S404 to the virtual viewpoint image generation apparatus 102. The virtual viewpoint image generation apparatus 115 generates a virtual viewpoint image corresponding to the received virtual viewpoint information/face-to-face virtual viewpoint information, and returns the virtual viewpoint image to the virtual viewpoint control apparatus 110. The virtual viewpoint control apparatus 110 then displays the received virtual viewpoint image on the UI screen, and an operator checks the virtual viewpoint image displayed on the UI screen and, in a case where the virtual viewpoint image is OK, gives a key frame registration instruction on the UI screen. FIG. 6A is a diagram for explaining a virtual viewpoint image displayed in a case where virtual viewpoint information has been transmitted in the above specific example, and FIG. 6B is a diagram for explaining a virtual viewpoint image displayed in a case where face-to-face virtual viewpoint information has been transmitted. Now, it is assumed that the player A is looking toward a player B in a real image capturing space. In a case where virtual viewpoint information on the current frame is transmitted in the normal mode (S409), a virtual viewpoint image 610 representing an appearance from a virtual camera 601 (see the left diagram in FIG. 6A) facing the player B in a position overlapping the player A is displayed on the UI screen. On the other hand, in a case where face-to-face virtual viewpoint information is transmitted in the face-to-face movement mode (S408), a virtual viewpoint image 620 representing an appearance from a dashed virtual camera 602 (see the left diagram in FIG. 6B) facing the player A in a face-to-face position 5 m away from the player A is displayed on the UI screen. Even in a case where the operator looks at the virtual viewpoint image 610 (see the right diagram in FIG. 6A), the player A is not seen in the virtual viewpoint image 610, so that the operator cannot know whether the virtual viewpoint image 610 corresponds to the scenery that the player A actually sees. On the other hand, in the case of the virtual viewpoint image 620 (see the right diagram in FIG. 6B), in a case where the player A is seen in the virtual viewpoint image 620 with the player A's eyes looking at the camera, the operator can determine that the image corresponds to the scenery that the player A actually sees. As described above, the operator can actually check whether the designated direction of the virtual camera corresponds to the line of sight of a player or the like by using the virtual viewpoint image corresponding to the virtual camera in the face-to-face position, and then give a key frame registration instruction. It should be noted that the bird's eye view images on the left side in FIGS. 6A and 6B above are shown for reference as visual indications of the positions and orientations of the virtual camera/face-to-face virtual camera corresponding to the virtual viewpoint images shown on the right side, but the bird's eye view images may be displayed on the UI screen together with the images on the right side. That is, a CG image showing a bird's eye view of an image capturing space may be displayed separately as a window for camera position checking, and an icon two-dimensionally representing the virtual camera to be operated may be superimposed and displayed thereon, so that the operator can check the position and orientation of the virtual camera being operated.

In S410, a step to be executed next is determined based on whether a key frame registration instruction has been input. In a case where the key frame registration instruction has been input, S411 is executed next. On the other hand, in a case where no key frame registration instruction has been input, S411 is skipped and S412 is executed next. Incidentally, the method for inputting the key frame registration instruction by an operator is not limited. For example, the operator may touch a predetermined button on the UI screen described above, or may press a predetermined key on the keyboard or a predetermined button on the controller 104.

In S411, the key frame registration unit 116 links the virtual viewpoint information calculated in S404 with the time code of the current frame and registers the information as a key frame. At this time, even in the face-to-face movement mode, not the face-to-face virtual viewpoint information obtained in S407 but the virtual viewpoint information calculated in S404 is registered as a key frame. This eliminates the need for the operator who has visually checked the virtual viewpoint image from the face-to-face position to operate the virtual camera again and re-designate a desired virtual viewpoint and enables efficient key frame registration. In this way, a camera path including a plurality of key frames is obtained.

In S412, it is determined whether there is an instruction to switch between operation modes. In a case where there is a switching instruction, the operation mode is changed to a newly designated operation mode in S413. In a case where there is no switching instruction, S414 is executed next.

In S414, it is determined whether to end the key frame registration. In a case where an instruction to end the key frame registration has been input, S415 is executed next. On the other hand, in a case where no instruction to end the key frame registration has been input, the process returns to S402 and is continued using the current frame as a previous frame and the next frame as a current frame. Since at least two key frames, that is, a start frame and an end frame, are needed in a camera path creation process to be described later, a warning or the like may be displayed in a case where two or more key frames are not registered.

In S415, it is determined whether to start creating a camera path. In a case where a camera path creation instruction has been input, S416 is executed next. On the other hand, in a case where no camera path creation instruction has been input, the process stands by for a certain period of time and then it is determined again whether an input has been received.

Figure 7:
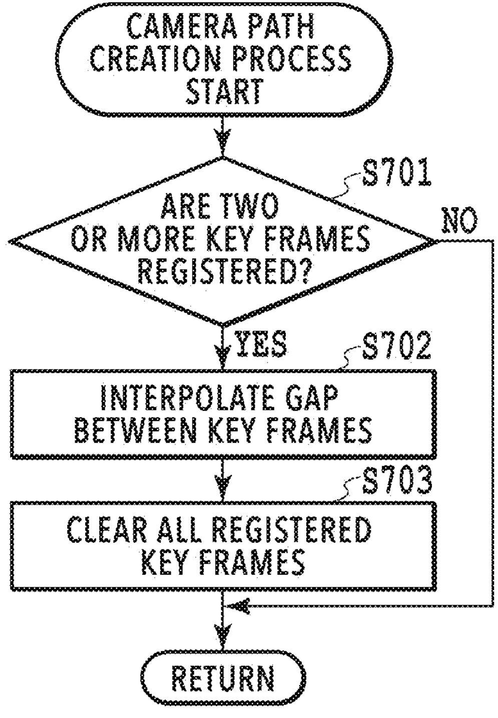
FIG. 7 is a flowchart showing the details of a process performed by a camera path creation unit.

In S416, the camera path creation unit 117 creates a camera path using the key frames registered by the key frame registration unit 116. FIG. 7 is a flowchart showing the details of a process performed by the camera path creation unit 117. The following description will be given with reference to the flowchart shown in FIG. 7.

In S701, a step to be executed next is determined based on whether a plurality of key frames needed for camera path creation have been registered. In a case where two or more key frames have been registered, S702 is executed next, and in a case where the two or more key frames have not been registered, since it is impossible to create a camera path, this flow is ended.

In S702, interpolation processing is performed between adjacent key frames among the plurality of registered key frames to generate virtual viewpoint information on an intermediate frame and create a camera path. The method of the interpolation processing is not specifically limited, but may be, for example, linear interpolation in which the plurality of registered key frames are connected in order with straight lines, or nonlinear interpolation in which the key frames are connected with smooth curves. In this way, a camera path based on the registered key frames is obtained.

In S703, all the registered key frames are cleared. This makes it possible to register new key frames and create a next camera path. In a case where the registered key frames have been cleared after the camera path creation, the process returns to the flow in FIG. 4, and the present process ends. Up to this point, the contents of the operation flow of the virtual viewpoint control apparatus 110 according to the present embodiment have been described.

Modifications

In the above embodiment, only the face-to-face virtual viewpoint information is provided in the face-to-face movement mode, but a set of the face-to-face virtual viewpoint information and the virtual viewpoint information on which the face-to-face virtual viewpoint information is based may be provided to display two types of virtual viewpoint images respectively corresponding to the virtual viewpoint information and the face-to-face virtual viewpoint information on the UI screen. Two displays 103 may be used to display the virtual viewpoint images on the respective displays 103, or one display 103 may display both virtual viewpoint images. In this case, at the same time, an operator can also check a virtual viewpoint image representing an appearance from the virtual camera that the operator has set.

In a case where a key frame registration instruction is given, virtual viewpoint information is registered as a key frame regardless of the operation mode at that time, but face-to-face virtual viewpoint information may be registered as a key frame in the face-to-face movement mode.

As described above, according to the present embodiment, since an operator can sequentially check whether the virtual viewpoint designated by the operator corresponds to the line of sight of a person by using an image representing an appearance from the face-to-face position, it is possible to create a camera path for a virtual viewpoint video that can accurately reproduce the viewpoint of the person.

Second Embodiment

In the first embodiment, the operator checks the position of the object of interest on the UI screen and then operates a joystick or the like to designate a virtual viewpoint, thereby calculating virtual viewpoint information representing the viewpoint of the object. Next, an aspect in which tracking information on the object of interest is obtained to automatically calculate virtual viewpoint information representing the viewpoint of the object will be described as a second embodiment. Incidentally, a description for the contents the same as those in the first embodiment will be omitted, and the following description will focus on an operation flow, which is a difference.

<System Configuration>

Figure 8:
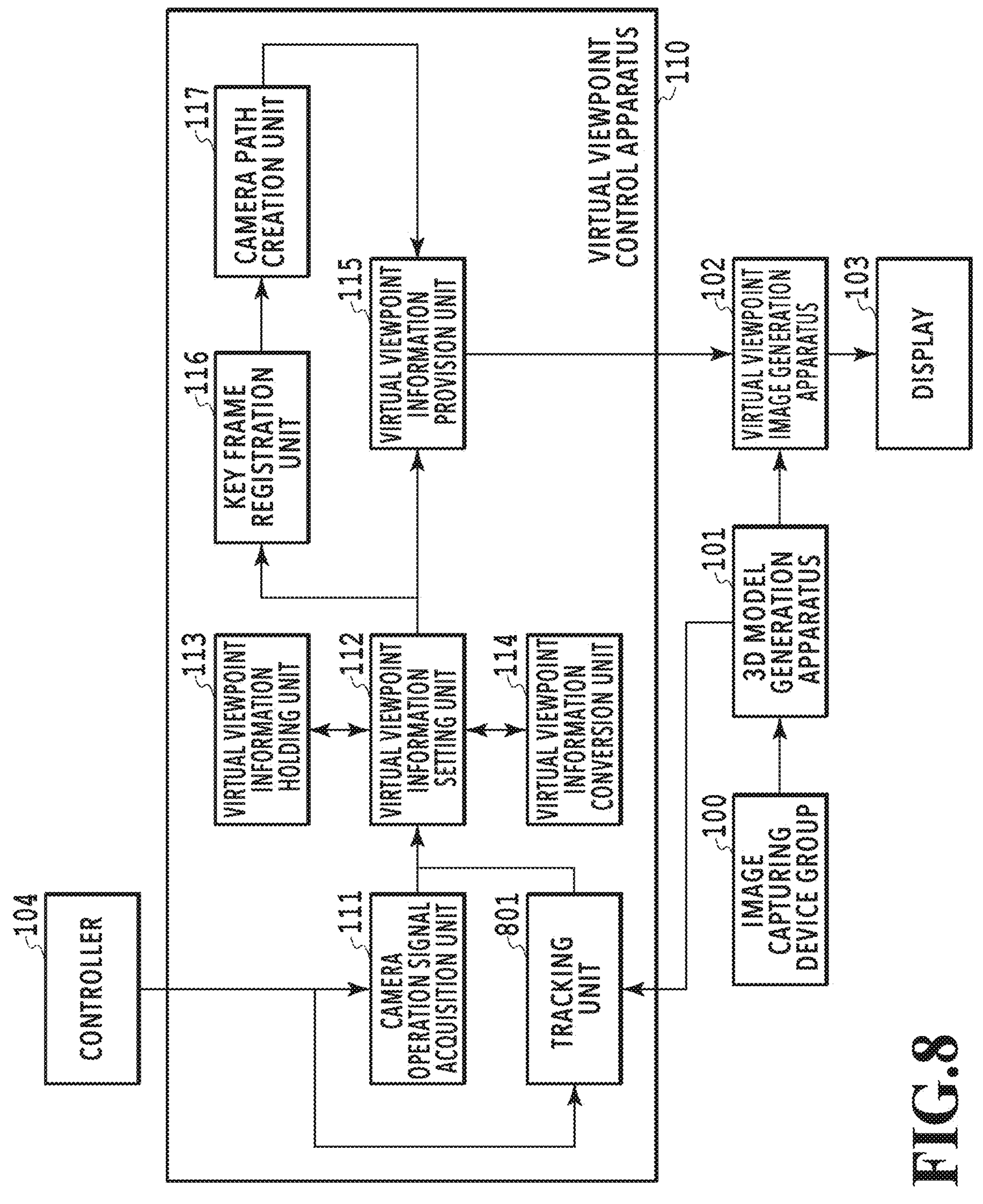
FIG. 8 is a diagram showing a configuration example of an image processing system that generates a virtual viewpoint image according to a second embodiment.

FIG. 8 is a diagram showing the configuration example of an image processing system for generating a virtual viewpoint image according to the present embodiment. The basic configuration is the same as that of the image processing system according to the first embodiment, and a difference is that a tracking unit 801 is added to the virtual viewpoint control apparatus 110.

The tracking unit 801 obtains a 3D model of each object from the 3D model generation apparatus 101 to perform tracking processing for each object by, for example, a method using machine learning, which is a known technique. Through this tracking processing, an ID that can uniquely identify the 3D model of each object is appended to the 3D model of each object, and an operator designates an object of interest using the ID appended to the 3D model. In this way, tracking information indicating the three-dimensional position [X, Y, Z] of the object of interest at each time during an image capturing period is obtained.

<Operation Flow of Virtual Viewpoint Control Apparatus>

Figure 9:
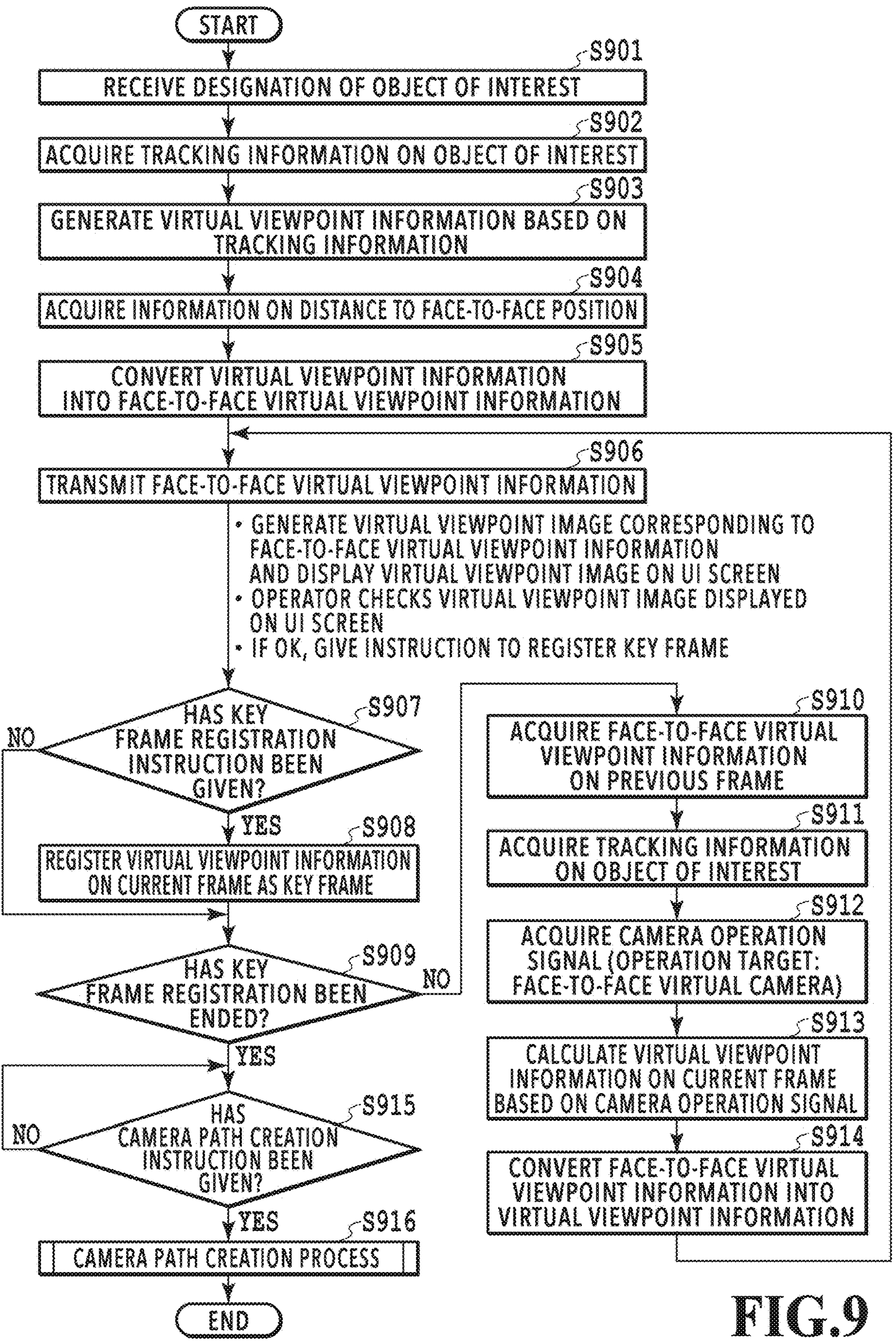
FIG. 9 is a flowchart showing a flow of operations in the virtual viewpoint control apparatus according to the second embodiment.

FIG. 9 is a flowchart showing an operation flow in the virtual viewpoint control apparatus 110 according to the present embodiment. This flow shows the operation flow in the face-to-face position mode, which is a feature, and a description of a change in operation mode is omitted. The following description will be given with reference to the flowchart in FIG. 9. Incidentally, this flow is executed on a frame-by-frame basis, but may also be executed at thinned frame intervals. In the following description, the symbol "S" means a step.

In S901, the designation of an object of interest by an operator is received via the controller 104 or the like.

In S902, the virtual viewpoint information setting unit 112 obtains, for the object of interest designated by the operator, tracking information on a current frame of interest as a processing target from the tracking unit 801.

In S903, the virtual viewpoint information setting unit 112 generates virtual viewpoint information based on the tracking information obtained in S902. At this time, to the position of each parameter of the virtual viewpoint information, the three-dimensional position [X, Y, Z] indicated by the tracking information is applied. To parameters other than the position, such as an orientation [Pan, Tilt, Roll] and a focal length [Zoom], preset default values may be applied, or the operator may manually set these initial values.

In S904, as in S406 in the flow in FIG. 4 in the first embodiment, the virtual viewpoint information conversion unit 114 obtains the value of the distance D input in the input field 202 on the UI screen shown in FIG. 2B above.

In S905, as in S407 in the flow in FIG. 4 in the first embodiment, the virtual viewpoint information conversion unit 114 converts the virtual viewpoint information generated in S903 into face-to-face virtual viewpoint information using Equations 8 to 15 above. The face-to-face virtual viewpoint information on the current frame after the conversion is saved in the RAM 313. The face-to-face virtual viewpoint information is then held by the virtual viewpoint information holding unit 113 and is used as face-to-face virtual viewpoint information on a previous frame in calculation of face-to-face virtual viewpoint information in S913 to be described later.

In S906, the virtual viewpoint information provision unit 115 transmits the face-to-face virtual viewpoint information on the current frame obtained in S905 to the virtual viewpoint image generation apparatus 102. The virtual viewpoint image generation apparatus 115 generates a virtual viewpoint image corresponding to the received face-to-face virtual viewpoint information and returns the virtual viewpoint image to the virtual viewpoint control apparatus 110. The virtual viewpoint control apparatus 110 then displays the received virtual viewpoint image from the face-to-face position on the UI screen, and the operator checks the virtual viewpoint image and, in a case where the virtual viewpoint image is OK, gives a key frame registration instruction on the UI screen.

In S907, a step to be executed next is determined based on whether the key frame registration instruction has been input. In a case where the key frame registration instruction has been input, S908 is executed next. On the other hand, in a case where no key frame registration instruction has been input, S908 is skipped and S909 is executed next.

In S908, the key frame registration unit 116 links the virtual viewpoint information generated in S903 or virtual viewpoint information after conversion obtained in S914 to be described later with the time code of the current frame and registers the information as a key frame.

In S909, it is determined whether to end the key frame registration. In a case where an instruction to end the key frame registration has been input, S916 is executed next. At this time, in a case where two or more key frames have not been registered, a warning or the like may be displayed. On the other hand, in a case where no instruction to end the key frame registration has been input, S910 is executed next.

In S910, the virtual viewpoint information setting unit 112 obtains the virtual viewpoint information on the previous frame from the virtual viewpoint information holding unit 113.

In S911, the virtual viewpoint information setting unit 112 obtains, from the tracking unit 801, tracking information on an object of interest in the current frame of interest as a processing target.

In S912, the camera operation signal acquisition unit 111 obtains a camera operation signal corresponding to the current frame from the controller 104. At this time, what the operator is operating is not a virtual camera corresponding to the viewpoint of the object of interest, but a virtual camera moved to a face-to-face position (hereinafter referred to as "face-to-face virtual camera").

In S913, the virtual viewpoint information setting unit 112 calculates face-to-face virtual viewpoint information on the current frame based on the face-to-face virtual viewpoint information on the previous frame obtained in S910 and the camera operation signal obtained in S912. This calculation uses Equations 16 to 22 below.

$$X'_{curr} = X'_{prev} + \Delta X \quad \text{Equation 16}$$

$$Y'_{curr} = Y'_{prev} + \Delta Y \quad \text{Equation 17}$$

$$Z'_{curr} = Z'_{prev} + \Delta Z \quad \text{Equation 18}$$

$$\text{Pan}'_{curr} = \text{Pan}'_{prev} + \Delta\text{Pan} \quad \text{Equation 19}$$

$$\text{Tilt}'_{curr} = \text{Tilt}'_{prev} + \Delta\text{Tilt} \quad \text{Equation 20}$$

$$\text{Roll}'_{curr} = \text{Roll}'_{prev} + \Delta\text{Roll} \quad \text{Equation 21}$$

-continued $$\text{Zoom}'_{curr} = \text{Zoom}'_{prev} + \Delta\text{Zoom} \quad \text{Equation 22}$$

In Equations 16 to 22 above, [$X'_{curr}$, $Y'_{curr}$, $Z'_{curr}$, $\text{Pan}'_{curr}$, $\text{Tilt}'_{curr}$, $\text{Roll}'_{curr}$, $\text{Zoom}'_{curr}$] represent the face-to-face virtual viewpoint information on the current frame. Further, [X'prev, Y'prev, Z'prev, Pan'prev, Tilt'prev, Roll'prev, Zoom'prev] represent the face-to-face virtual viewpoint information on the previous frame. The calculated face-to-face virtual viewpoint information is held by the virtual viewpoint information holding unit 113 and is used as the face-to-face virtual viewpoint information on the previous frame in the calculation of face-to-face virtual viewpoint information on a next current frame.

In S914, the virtual viewpoint information conversion unit 114 converts the face-to-face virtual viewpoint information generated in S913 into virtual viewpoint information. This conversion is the reverse of the conversion in S905. That is, the virtual camera represented by the virtual viewpoint information after the conversion is restricted to rotate around the vertical axis passing through a point a predetermined distance (half the distance D, described later.) away in the direction in which the face-to-face virtual camera represented by the face-to-face virtual viewpoint information before the conversion. In the conversion in this step, it is only required that unknown virtual viewpoint information [$X_{curr}$, $Y_{curr}$, $Z_{curr}$, $\text{Pan}_{curr}$, $\text{Tilt}_{curr}$, $\text{Roll}_{curr}$, $\text{Zoom}_{curr}$] be determined from the known face-to-face virtual viewpoint information [$X'_{curr}$, $Y'_{curr}$, $Z'_{curr}$, $\text{Pan}'_{curr}$, $\text{Tilt}'_{curr}$, $\text{Roll}'_{curr}$, $\text{Zoom}'_{curr}$] by modifying, for example, Equations 8 to 14 above. The virtual viewpoint information on the current frame after the conversion is saved in the RAM 313. The process then returns to S906, and the face-to-face virtual viewpoint information calculated in S913 is transmitted to the virtual viewpoint image generation apparatus 102.

In S915, it is determined whether to start creating a camera path. In a case where a camera path creation instruction has been input, S916 is executed next. On the other hand, in a case where no camera path creation instruction has been input, the process stands by for a certain period of time and then it is determined again whether an input has been received.

In S916, the camera path creation unit 117 creates a camera path using the key frames registered by the key frame registration unit 116. Since the details of the camera path creation process are the same as those described in the flow in FIG. 7 above and there is no particular difference, a description thereof will be omitted.

Up to this point, the contents of the operation flow of the virtual viewpoint control apparatus 110 according to the present embodiment have been described. In the face-to-face movement mode according to the present embodiment, the contents of an operation performed on a face-to-face virtual camera by an operator are reflected in virtual viewpoint information.

As described above, according to the present embodiment, virtual viewpoint information is calculated based on tracking information on an object of interest, and an image based on face-to-face virtual viewpoint information into which the virtual viewpoint information has been converted is displayed on the UI screen. In the present embodiment, an operator does not need to operate a joystick or the like while following the object of interest moving freely around in a three-dimensional space with the operator's own eyes, but can register key frames by operating the joystick or the like while looking only at an image capturing the object of interest from the front, and it is easier to create a camera path corresponding to a player's line of sight.

Other Embodiment

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to realize a virtual viewpoint image reproducing the viewpoint of a person or the like with high accuracy.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-021469, filed Feb. 15, 2024 which is hereby incorporated by reference wherein in its entirety.

What is claimed is:

1. A virtual viewpoint control apparatus comprising:

one or more memories storing instructions; and one or more processors executing the instructions to:

obtain an operation signal designating a position and an orientation in a virtual space of a first virtual viewpoint corresponding to a virtual viewpoint image to be generated based on a plurality of captured images obtained by performing image capturing with a plurality of image capturing devices;

determine a second virtual viewpoint that is positioned on the optical axis of the first virtual viewpoint identified by the obtained operation signal and that faces the first virtual viewpoint;

set virtual viewpoint information representing the first virtual viewpoint at a plurality of respective times, in response to an instruction from an operator based on a virtual viewpoint image corresponding to the determined second virtual viewpoint; and generate trajectory information indicating a trajectory of the first virtual viewpoint by interpolating the position of the first virtual viewpoint and the orientation from the first virtual viewpoint for times different from the plurality of respective times based on the virtual viewpoint information, wherein a position of the second virtual viewpoint is determined to be a position where the first virtual viewpoint is rotated around a vertical axis passing through a point a predetermined distance away in the direction in which the position of the first virtual viewpoint, and wherein a distance between the position of the first virtual viewpoint and the position of the second virtual viewpoint is determined based on the instruction from the operator, and wherein the second virtual viewpoint is determined by using equations, $$X'_{curr}=X_{curr}+D*\sin(\mathrm{Pan}_{curr})*\cos(\mathrm{Tilt}_{curr})$$

$$Y'_{curr}=y_{curr}+D*\cos(\mathrm{Pan}_{curr})*\cos(\mathrm{Tilt}_{curr})$$

$$Z'_{curr}=Z_{curr}+D*\sin(\mathrm{Tilt}_{curr})$$

$$\mathrm{Pan}'_{curr}=\mathrm{Pan}_{curr}+\pi$$

$$\mathrm{Tilt}'_{curr}=-\mathrm{Tilt}_{curr}$$

$$\mathrm{Roll}'_{curr}=-\mathrm{Roll}_{curr}$$

$$\mathrm{Zoom}'_{curr}=\mathrm{Zoom}_{curr}$$

wherein

D represents a distance between the position of the first virtual viewpoint and the position of the second virtual viewpoint, $X'_{curr}$, $Y'_{curr}$, and $Z'_{curr}$ represent a position in a three-dimensional coordinate system of the second virtual viewpoint, $\mathrm{Pan}'_{curr}$, $\mathrm{Tilt}'_{curr}$, and $\mathrm{Roll}'_{curr}$ represent an orientation of the second virtual viewpoint, $\mathrm{Zoom}'_{curr}$ represents a focal length of the second virtual viewpoint, $X_{curr}$, $Y_{curr}$, and $Z_{curr}$ represent a position in a three-dimensional coordinate system of the first virtual viewpoint, $\mathrm{Pan}_{curr}$, $\mathrm{Tilt}_{curr}$, and $\mathrm{Roll}_{curr}$ represent an orientation of the first virtual viewpoint, and $\mathrm{Zoom}_{curr}$ represents a focal length of the first virtual viewpoint.

2. The virtual viewpoint control apparatus according to claim 1, wherein the second virtual viewpoint is determined by using equations, $$X'_{curr}=X_{curr}+D*\sin(\mathrm{Pan}_{curr})*\cos(\mathrm{Tilt}_{curr})$$

$$Y'_{curr}=Y_{curr}+D*\cos(\mathrm{Pan}_{curr})*\cos(\mathrm{Tilt}_{curr})$$

$$Z'_{curr}=Z_{curr}+D*\sin(\mathrm{Tilt}_{curr})$$

$$\mathrm{Pan}'_{curr}=\mathrm{Pan}_{curr}+\pi$$

$$\mathrm{Tilt}'_{curr}=-\mathrm{Tilt}_{curr}$$

$$\mathrm{Roll}'_{curr}=\mathrm{Roll}_{curr}$$

$$\mathrm{Zoom}'_{curr}=\mathrm{Zoom}_{curr}$$

wherein

D represents a distance between the position of the first virtual viewpoint and the position of the second virtual viewpoint, $K'_{curr}$, $Y'_{curr}$, and $Z'_{curr}$ represent a position in a three-dimensional coordinate system of the second virtual viewpoint, $Pan'_{curr}$, $Tilt'_{curr}$, and $Roll'_{curr}$ represent an orientation of the second virtual viewpoint, $Zoom'_{curr}$ represents a focal length of the second virtual viewpoint, $X_{curr}$, $Y_{curr}$, and $Z_{curr}$ represent a position in a three-dimensional coordinate system of the first virtual viewpoint, $Pan_{curr}$, $Tilt_{curr}$, and $Roll_{curr}$ represent an orientation of the first virtual viewpoint, and $Zoom_{curr}$ represents a focal length of the first virtual viewpoint.

3. The virtual viewpoint control apparatus according to claim 1, wherein there are a first mode and a second mode as operation modes, in a case of the first mode, the second virtual viewpoint is determined, and in response to the instruction from the operator based on a virtual viewpoint image corresponding to the determined second virtual viewpoint, virtual viewpoint information representing the first virtual viewpoint or the second virtual viewpoint is set, and in a case of the second mode, the second virtual viewpoint is not determined, and in response to the instruction from the operator, virtual viewpoint information representing the first virtual viewpoint is set.

4. The virtual viewpoint control apparatus according to claim 1, wherein a virtual viewpoint image to be generated in accordance with the set virtual viewpoint information is an image reproducing a viewpoint of an object seen in the plurality of captured images, and one of the first virtual viewpoint and the second virtual viewpoint is a virtual viewpoint corresponding to the viewpoint of the object.

5. The virtual viewpoint control apparatus according to claim 4, wherein the one or more processors further executes the instructions to:

further obtain tracking information indicating a three-dimensional position of the object at each time during a period of time in which the plurality of captured images are captured, wherein a position of the first virtual viewpoint is identified based on the obtained tracking information and an orientation of the first virtual viewpoint is identified based on the obtained operation signal.

6. A method for controlling a virtual viewpoint, the method comprising the steps of:

obtaining an operation signal designating a position and an orientation in a virtual space of a first virtual viewpoint corresponding to a virtual viewpoint image to be generated based on a plurality of captured images obtained by performing image capturing with a plurality of image capturing devices;

determining a second virtual viewpoint that is positioned on the optical axis of the first virtual viewpoint identified by the obtained operation signal and that faces the first virtual viewpoint;

setting virtual viewpoint information representing the first virtual viewpoint at a plurality of respective times, in response to an instruction from an operator based on a virtual viewpoint image corresponding to the determined second virtual viewpoint; and generating trajectory information indicating a trajectory of the first virtual viewpoint by interpolating the position of the first virtual viewpoint and the orientation from the first virtual viewpoint for times different from the plurality of respective times based on the virtual viewpoint information, wherein a position of the second virtual viewpoint is determined to be a position where the first virtual viewpoint is rotated around a vertical axis passing through a point a predetermined distance away in the direction in which the position of the first virtual viewpoint, and wherein a distance between the position of the first virtual viewpoint and the position of the second virtual viewpoint is determined based on the instruction from the operator, and wherein the second virtual viewpoint is determined by using equations, $$X'_{curr}=X_{curr}+D*\sin(Pan_{curr})*\cos(Tilt_{curr})$$

$$Y'_{curr}=y_{curr}+D*\cos(Pan_{curr})*\cos(Tilt_{curr})$$

$$Z'_{curr}=Z_{curr}+D*\sin(Tilt_{curr})$$

$$Pan'_{curr}=Pan_{curr}+\pi$$

$$Tilt'_{curr}=-Tilt_{curr}$$

$$Roll'_{curr}=-Roll_{curr}$$

$$Zoom'_{curr}=Zoom_{curr}$$

wherein

D represents a distance between the position of the first virtual viewpoint and the position of the second virtual viewpoint, $X'_{curr}$, $Y'_{curr}$, and $Z'_{curr}$ represent a position in a three-dimensional coordinate system of the second virtual viewpoint, $Pan'_{curr}$, $Tilt'_{curr}$, and $Roll'_{curr}$ represent an orientation of the second virtual viewpoint, $Zoom'_{curr}$ represents a focal length of the second virtual viewpoint, $X_{curr}$, $Y_{curr}$, and $Z_{curr}$ represent a position in a three-dimensional coordinate system of the first virtual viewpoint, $Pan_{curr}$, $Tilt_{curr}$, and $Roll_{curr}$ represent an orientation of the first virtual viewpoint, and $Zoom_{curr}$ represents a focal length of the first virtual viewpoint.

7. A non-transitory computer readable storage medium storing a program for causing a computer to perform a method for controlling a virtual viewpoint, the method comprising the steps of:

obtaining an operation signal designating a position and an orientation in a virtual space of a first virtual viewpoint corresponding to a virtual viewpoint image to be generated based on a plurality of captured images obtained by performing image capturing with a plurality of image capturing devices;

determining a second virtual viewpoint that is positioned on the optical axis of the first virtual viewpoint identified by the obtained operation signal and that faces the first virtual viewpoint;

setting virtual viewpoint information representing the first virtual viewpoint at a plurality of respective times, in response to an instruction from an operator based on a virtual viewpoint image corresponding to the determined second virtual viewpoint; and generating trajectory information indicating a trajectory of the first virtual viewpoint by interpolating the position of the first virtual viewpoint and the orientation from the first virtual viewpoint for times different from the plurality of respective times based on the virtual viewpoint information, wherein a position of the second virtual viewpoint is determined to be a position where the first virtual viewpoint is rotated around a vertical axis passing through a point a predetermined distance away in the direction in which the position of the first virtual viewpoint, and wherein a distance between the position of the first virtual viewpoint and the position of the second virtual viewpoint is determined based on the instruction from the operator, and wherein the second virtual viewpoint is determined by using equations, $$X'_{curr}=X_{curr}+D*\sin(\mathrm{Pan}_{curr})*\cos(\mathrm{Tilt}_{curr})$$

$$Y'_{curr}=y_{curr}+D*\cos(\mathrm{Pan}_{curr})*\cos(\mathrm{Tilt}_{curr})$$

$$Z'_{curr}=Z_{curr}+D*\sin(\mathrm{Tilt}_{curr})$$

$$\mathrm{Pan}'_{curr}=\mathrm{Pan}_{curr}+\pi$$

$$\mathrm{Tilt}'_{curr}=-\mathrm{Tilt}_{curr}$$

$$\mathrm{Roll}'_{curr}=-\mathrm{Roll}_{curr}$$

$$\mathrm{Zoom}'_{curr}=\mathrm{Zoom}_{curr}$$

wherein

D represents a distance between the position of the first virtual viewpoint and the position of the second virtual viewpoint, $X'_{curr}$, $Y'_{curr}$, and $Z'_{curr}$ represent a position in a three-dimensional coordinate system of the second virtual viewpoint, $\mathrm{Pan}'_{curr}$, $\mathrm{Tilt}'_{curr}$, and $\mathrm{Roll}'_{curr}$ represent an orientation of the second virtual viewpoint, $\mathrm{Zoom}'_{curr}$ represents a focal length of the second virtual viewpoint, $X_{curr}$, $Y_{curr}$, and $Z_{curr}$ represent a position in a three-dimensional coordinate system of the first virtual viewpoint, $\mathrm{Pan}_{curr}$, $\mathrm{Tilt}_{curr}$, and $\mathrm{Roll}_{curr}$ represent an orientation of the first virtual viewpoint, and $\mathrm{Zoom}_{curr}$ represents a focal length of the first virtual viewpoint.

* * * * *